Figure 1:
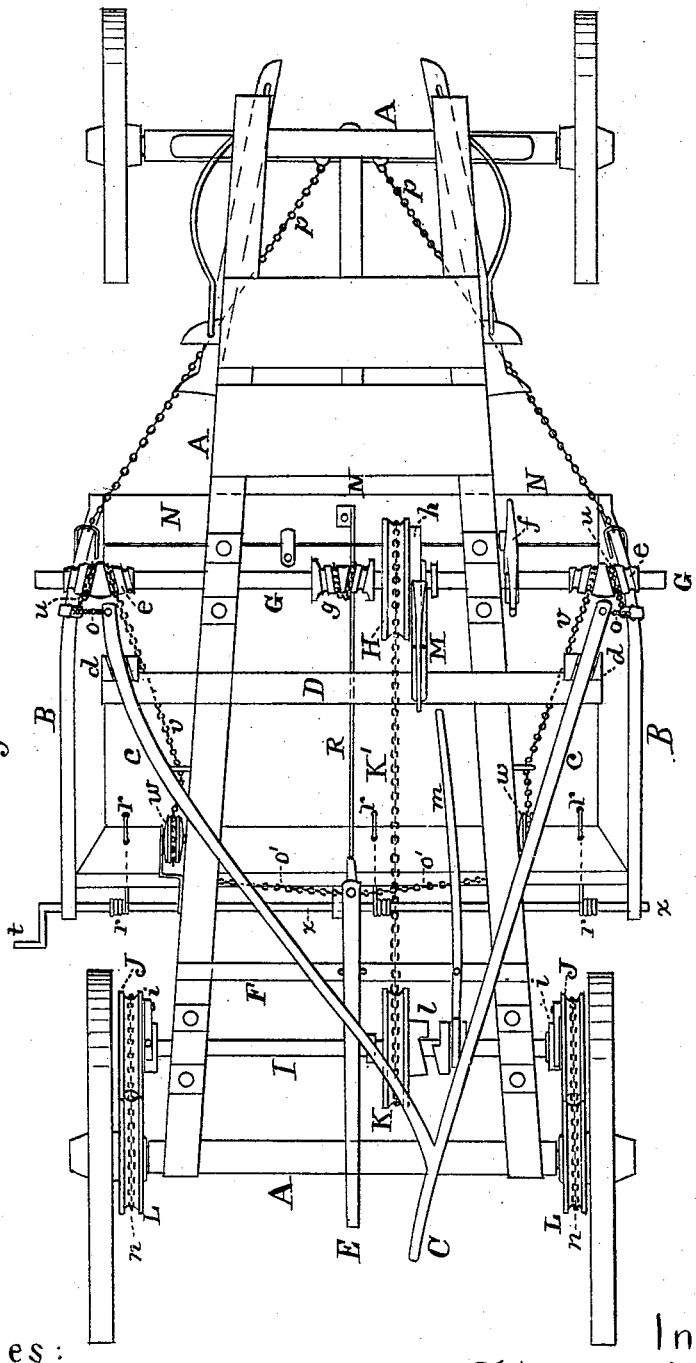

2 Sheets--Sheet 1.

W. E. LEE.
Scrapers.

No. 149,229.

Patented March 31, 1874.

Witnesses:
A. Lacey
R. Lacey

Inventor:
William E. Lee
per G. B. Towles Atty

AM.PHOTO-LITHOGRAPHIC Co.N.Y. (OSBORNE'S PROCESS.)

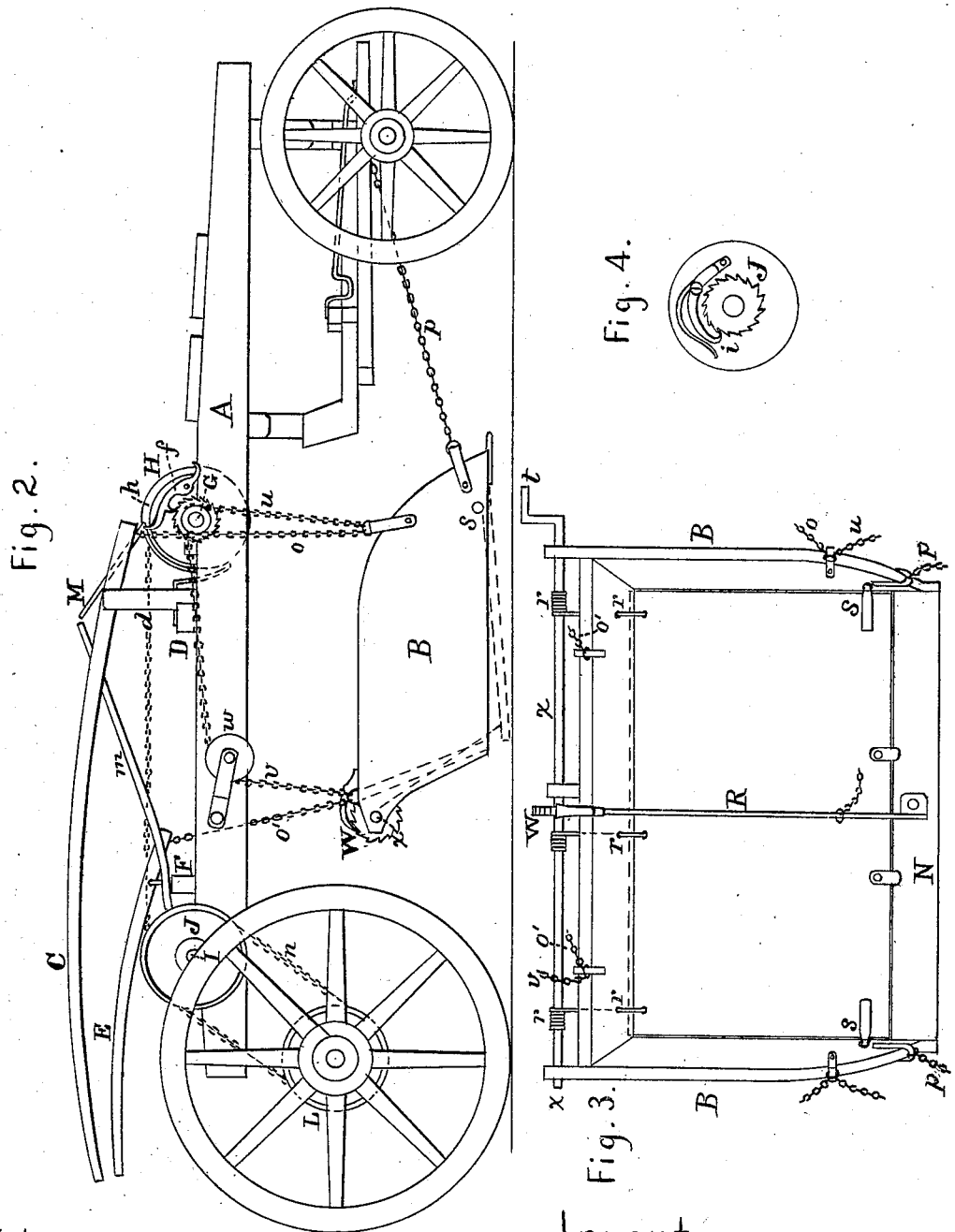

UNITED STATES PATENT OFFICE.

WILLIAM E. LEE, OF FREMONT, NEBRASKA.

IMPROVEMENT IN SCRAPERS.

Specification forming part of Letters Patent No. 149,229, dated March 31, 1874; application filed February 12, 1874.

*To all whom it may concern:*

Be it known that I, WILLIAM E. LEE, of the city of Fremont, in the county of Dodge and State of Nebraska, have invented certain new and useful Improvements in a Four-Wheeled Self-Hoisting Suspension-Scraper; and I do hereby declare the following to be a full, clear, and exact description of the invention, such as will enable others skilled in the art to which it pertains to make and use it, reference being had to the accompanying drawings, which form part of this specification.

My invention relates to scraping-machines, such as are used in excavating for the construction of railroads and canals; and consists in certain improvements and modifications in the construction of the same, as hereinafter shown and described.

In the accompanying drawings, which illustrate my invention and form a part of the specification thereof, Figure 1 is a plan view of my machine. Fig. 2 is a side view of same. Fig. 3 is a plan view of the scraper. Fig. 4 is a view of inner side of wheel J, referred to herein.

In the drawing referred to, A designates the frame of a four-wheeled vehicle, supporting the operating mechanism, and under which the scraper B is suspended. C indicates a curved lever, having the branches $c\ c$, the same being pivoted to the supports $d\ d$ upon the extremities of the cross-bar D. Another lever, indicated by E, is pivoted to and has its fulcrum on the cross-bar F. The shaft G crosses the frame, and has its bearings thereon. Attached to said shaft, about the center, is the grooved spool or scroll $g$, and the scrolls $e\ e$ at or near the extremities of said shaft. Fixed upon said shaft is the pulley-wheel H, having a flange, $h$, on one side thereof, the revolution of said wheel causing the shaft to revolve, and a backward revolution being prevented by the ratchet $f$. Near the rear end of the frame A is placed the counter-shaft I, also having its bearings on the frame which it crosses. Placed on said counter-shaft, at the extremities thereof, are the pulley-wheels J, each being provided with a ratchet, $i$, attached as shown in Fig. 4, so as to allow either a forward or backward movement of the wheels J. The pulley-wheel K is also placed on the counter-shaft, on a line with the wheel H, as shown, the endless chain or band K' passing over both of said wheels. The said wheel K is put in operation by means of the clutch $l$ on the counter-shaft, and operated by means of the lever $m$. Rigidly attached to the hubs of the hind-wheels of the vehicle are the pulley-wheels L, the endless chains or bands $n$ passing over the wheels J and L, so, as the vehicle moves forward, the rear wheels act as driving-wheels to the operating mechanism. The friction-brake M is intended to stop the motion of the hoisting-shaft by bearing against the flange $h$ on the wheel H. The scraper B, at the fore part thereof, is connected with the ends of the curved double lever C by the chains or cords $o$, and at the back part with the short lever E by the chains or cords $o'$; it, also, has the drawing chains or cords $p$, attaching it to the axle of the fore-wheels of the vehicle. Extending across the front of the scraper, at the bottom, is firmly fixed the knife or cutting-bar N. The bottom of the scraper B is hinged to the sides thereof at $s$, and constructed to be let down for the purpose of discharging a load of earth. When the bottom is closed, it is held in position by the cords or chains $r$, which, passing through apertures in the back-board, are attached to and wind upon the shaft $x$, extending across the rear and operated by the crank $t$, as shown, the said shaft being held by the ratchet or windlass W as it is turned. The scraper may also be made with the partition R attached to the back-board, and extending along the center to the cutting-bar, to which it is fastened. The spool $g$, attached to the shaft G, has a chain or cord fastened thereto, which connects it with partition R of the scraper below, so that the chain is wound upon the spool when the shaft revolves. Each of the scrolls $e\ e$ has two chains or cords fastened thereto, one of which, $u$, connects with the side of the scraper near the front, and the other, $v$, passes backward over the small pulley-wheel $w$, and is attached to the scraper at the back, so that the said chains are wound upon the scrolls $e\ e$ when the shaft G is revolved by a forward movement.

It will be seen from the description that the rear of the scraper B is readily raised when starting, by means of the short lever E. The front may be instantly raised when the scraper is full, by means of the long double lever C, and the scraper is secured at the proper elevation by the contraction of the chains attached to the spools on the shaft G, the said chains being wound thereon as the shaft revolves.

In operation, as the vehicle starts, a man bears down upon the short lever E, and, when the scraper is full, said lever is released, and the double lever C is used to raise the front of the scraper. The driver standing on the vehicle then closes the clutch $l$ on the wheel K, and the latter communicating with the wheel H on the hoisting-shaft, causes said shaft to revolve until the scraper is raised sufficiently and secured by the ratchet $f$. The clutch $l$ is then turned off from the wheel K, the load drawn away and discharged by releasing the crank-shaft $x$ from the ratchet W, the bottom of the scraper falling away when the shaft is released.

Having described my invention, I claim—

1. The scraper B provided with the cutting-bar, hinged bottom, crank-shaft, ratchet, and chains or cords, in combination with the levers C and E, for the purposes set forth.

2. The hoisting-shaft G provided with the spools or scrolls and chains attached thereto, wheel H, friction-brake M, and pulley $w$, in combination with the scraper B, constructed to operate as shown.

3. The counter-shaft I provided with pulleys J and L, with endless-chain bands, ratchets $i$, wheel K communicating with wheel H and clutch $l$, in combination with endless chain K' and hoisting-shaft G, constructed to operate as set forth.

In testimony that I claim the foregoing I have hereunto set my hand this 24th day of October, 1873.

WILLIAM E. LEE.

Witnesses:
   THOMAS R. GIBSON,
   WILLIAM MARTIN.